(12) United States Patent
Martin

(10) Patent No.: US 10,957,223 B2
(45) Date of Patent: Mar. 23, 2021

(54) BRAILLE PRINTING DEVICE

(71) Applicant: Jack B. Martin, Oak Park, CA (US)

(72) Inventor: Jack B. Martin, Oak Park, CA (US)

(*) Notice: Subject to any disclaimer, the term of this patent is extended or adjusted under 35 U.S.C. 154(b) by 0 days.

(21) Appl. No.: 16/914,212

(22) Filed: Jun. 26, 2020

(65) Prior Publication Data

US 2020/0327830 A1    Oct. 15, 2020

Related U.S. Application Data

(63) Continuation-in-part of application No. 16/401,682, filed on May 2, 2019, now Pat. No. 10,769,970, which is a continuation of application No. 15/977,421, filed on May 11, 2018, now Pat. No. 10,283,018.

(51) Int. Cl.

| | |
|---|---|
| *G09F 7/16* | (2006.01) |
| *B41J 3/32* | (2006.01) |
| *B41M 1/30* | (2006.01) |
| *B44C 3/00* | (2006.01) |
| *B41M 7/00* | (2006.01) |
| *B23K 26/38* | (2014.01) |
| *B41F 33/16* | (2006.01) |
| *B23K 26/08* | (2014.01) |
| *B23K 26/00* | (2014.01) |
| *B23K 26/12* | (2014.01) |
| *B23K 37/02* | (2006.01) |
| *G09B 21/02* | (2006.01) |
| *B23K 101/18* | (2006.01) |
| *B23K 103/16* | (2006.01) |

(52) U.S. Cl.
CPC .......... *G09F 7/165* (2013.01); *B23K 26/0006* (2013.01); *B23K 26/0093* (2013.01); *B23K 26/0876* (2013.01); *B23K 26/127* (2013.01); *B23K 26/38* (2013.01); *B23K 37/0235* (2013.01); *B41F 33/16* (2013.01); *B41J 3/32* (2013.01); *B41M 1/305* (2013.01); *B41M 7/0081* (2013.01); *B44C 3/005* (2013.01); *G09B 21/02* (2013.01); *B23K 2101/18* (2018.08); *B23K 2103/172* (2018.08)

(58) Field of Classification Search
CPC . G09F 7/165; B23K 26/0006; B23K 26/0093; B41J 3/32; B41M 1/305
See application file for complete search history.

(56) References Cited

U.S. PATENT DOCUMENTS

| | | |
|---|---|---|
| 4,600,320 A | 7/1986 | Hoovler et al. |
| 4,735,516 A | 4/1988 | Galarneau |
| 5,512,122 A | 4/1996 | Sokyrka |
| 6,241,405 B1 | 6/2001 | Burman et al. |
| 7,419,317 B2 | 9/2008 | Akaiwa |

(Continued)

*Primary Examiner* — Lamson D Nguyen
(74) *Attorney, Agent, or Firm* — Olav M. Underdal; IDP Patent Services

(57) ABSTRACT

A braille printing device includes a device body; a linear actuator with an actuator body and an actuator hammer; a liquid ejection unit, including a liquid container a resin piston, and a dispensing tube; a slidable connector with a groove; a vertical stop; a trigger switch; a slide stop member; a slide holder plate including a slide holder back portion, a slide stop member, and first and second sliding rails; and a control unit, such that the braille printing device deposits spherical domes of printing fluid on a printing substrate to form a braille text.

25 Claims, 13 Drawing Sheets

(56) References Cited

U.S. PATENT DOCUMENTS

| | | |
|---|---|---|
| 9,849,707 B2 | 12/2017 | Chopra et al. |
| 10,286,704 B2 | 5/2019 | Nariyama |
| 2002/0009318 A1* | 1/2002 | Maie .......................... B41J 3/32 400/109.1 |

* cited by examiner

Braille Printing Device

Braille Printing Device

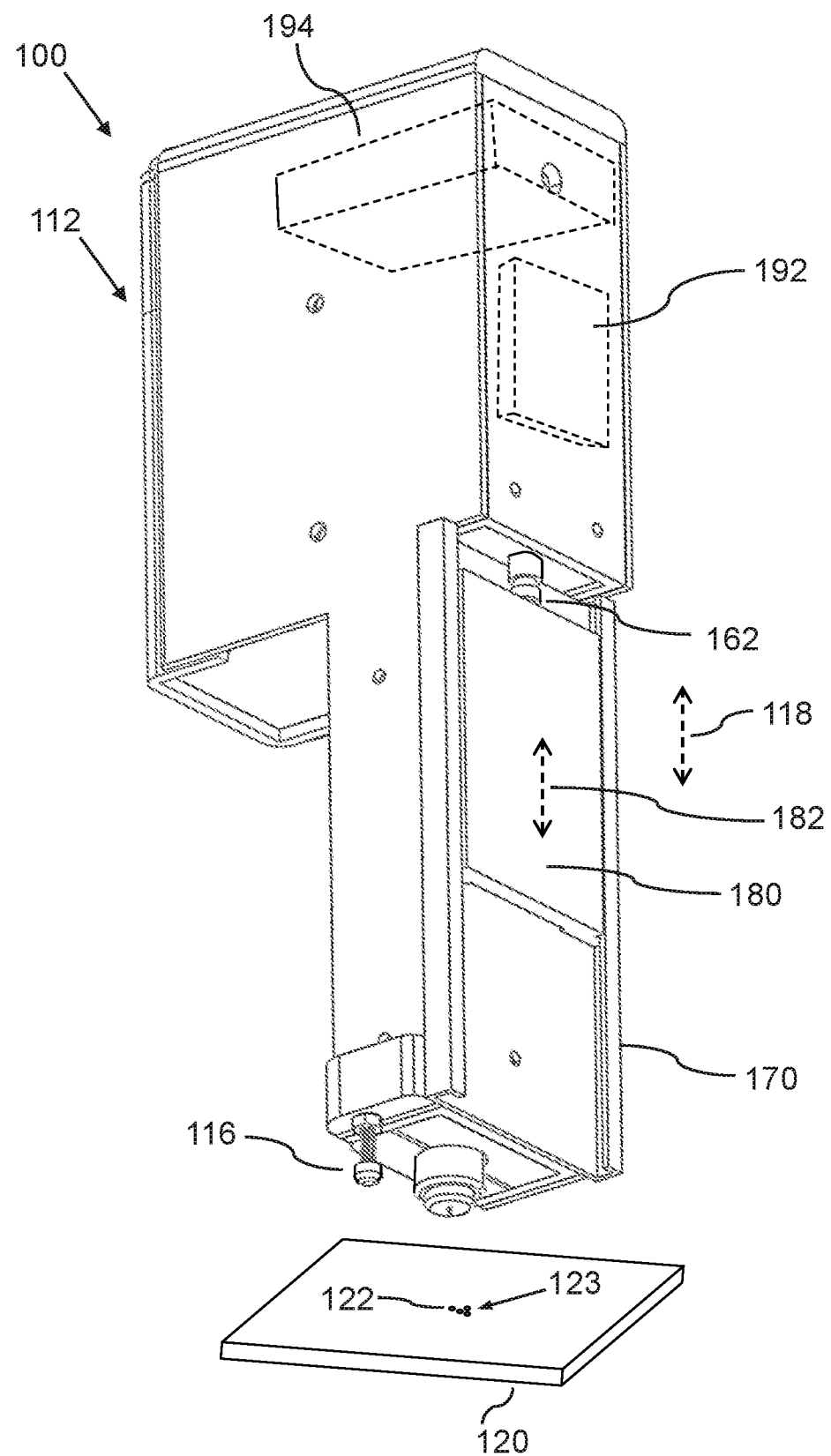

Braille Printing System

Control Unit

BRAILLE PRINTING DEVICE

CROSS-REFERENCE TO RELATED APPLICATIONS

This application is a continuation in part of application Ser. No. 16/401,682, filed May 2, 2019, which is a continuation of application Ser. No. 15/977,421, filed May 11, 2018, now U.S. Pat. No. 10,283,018, issued May 7, 2019; both of which are hereby incorporated herein by reference in their entirety.

FIELD OF THE INVENTION

The present invention relates generally to the field of braille dot manufacturing, and more particularly to methods and systems for manufacturing braille dots on ADA (Americans with Disabilities Act) compliant signs.

BACKGROUND OF THE INVENTION

Manufacturing of braille dots for ADA compliant signs according to conventional method requires use of complex systems and methods, that necessitate extensive training and are associated with a time-consuming manufacturing process.

Current common methods of manufacturing braille dots include:
a) Raster type braille, which is done using complicated machinery to drill and force small acrylic spheres into the newly drill hole only halfway, thereby leaving half of the sphere above the surface resulting in a raised bump, which forms a braille dot; and
b) Photopolymer braille, which is the most complicated method, involving creation of a photo negative, which is used as a mask for ultraviolet light exposure on to a special light sensitive plate. After exposing, the uncured areas are removed leaving only the raised areas to produce the braille dots.

As such, considering the foregoing, it may be appreciated that there continues to be a need for novel and improved devices and methods for printing braille text.

SUMMARY OF THE INVENTION

The foregoing needs are met, to a great extent, by the present invention, wherein in aspects of this invention, enhancements are provided to the existing model of printing of braille text.

In an aspect, a braille printing device can include:
a) a device body, which is slidably connected to an engraving machine, such that the device body is vertically slidable, to adjust a height between an ejection aperture of the braille printing device and a printing panel;
b) a linear actuator, which can include:
  i. an actuator body, which can be connected to the device body; and
  ii. an actuator hammer, which is vertically slidable, relative to the actuator body;
c) a liquid ejection unit, which is connected to the device body, such that an ejection aperture of the liquid ejection unit is configured to point downward, such that the liquid ejection unit is configured to inject liquid drops of a printing fluid on the printing panel, wherein the liquid ejection unit can include:
  i. a liquid container, which can include an upper opening into a container interior, which can be filled with a liquid resin;
  ii. a resin piston, which can include:
    a shaft member; and
    piston member, which is connected to a lower end of the shaft member;
    wherein the resin piston penetrates into the container interior, such that the piston member of the resin piston seals walls of the container interior, and such that downward pressure on the shaft member of the resin piston pressurizes the liquid resin in the container interior; and
  iii. a dispensing tube, which is hollow, such that an upper end of the dispensing tube is in fluid connection with the liquid container, wherein a lower end of the dispensing tube includes an ejection aperture;
d) a control unit, which can be configured to control the liquid ejection unit, such that the control unit;
such that when the actuator hammer strikes the upper part of the resin piston, this causes the lower part of the resin piston to impact with the liquid resin, such that the lower part of the resin piston causes a shockwave to travel through the liquid resin, such that the shockwave pushes out a resin droplet from the ejection aperture, such that the resin droplet hangs from the ejection aperture of the dispensing tube;
such that the resin droplet contacts with a printing substrate surface below the dispensing tube, such that surface tension causes the resin droplet to transfer to the surface of the printing substrate, such that the resin droplet forms a braille dot on the surface of the printing substrate;
such that the control unit controls the liquid ejection unit, such that the liquid ejection unit can deposit spherical domes/dots of the liquid resin on an exposed surface of the printing substrate, such that the spherical domes form a braille text of raised braille elements.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1C is a rear bottom perspective view of a braille printing device, according to an embodiment of the invention.

DETAILED DESCRIPTION

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

Figure 1A:
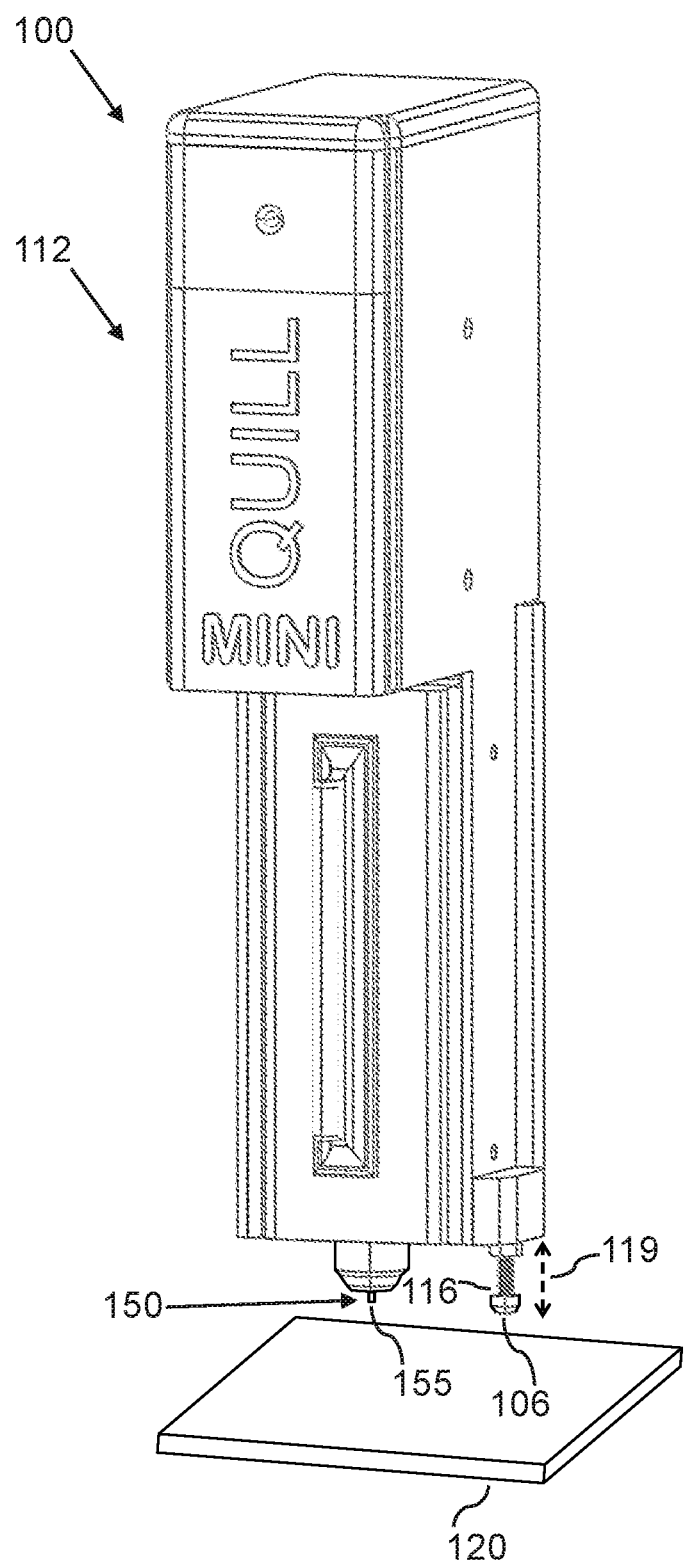
FIG. 1A is a top front perspective view of a braille printing device, according to an embodiment of the invention.
Figure 1B:
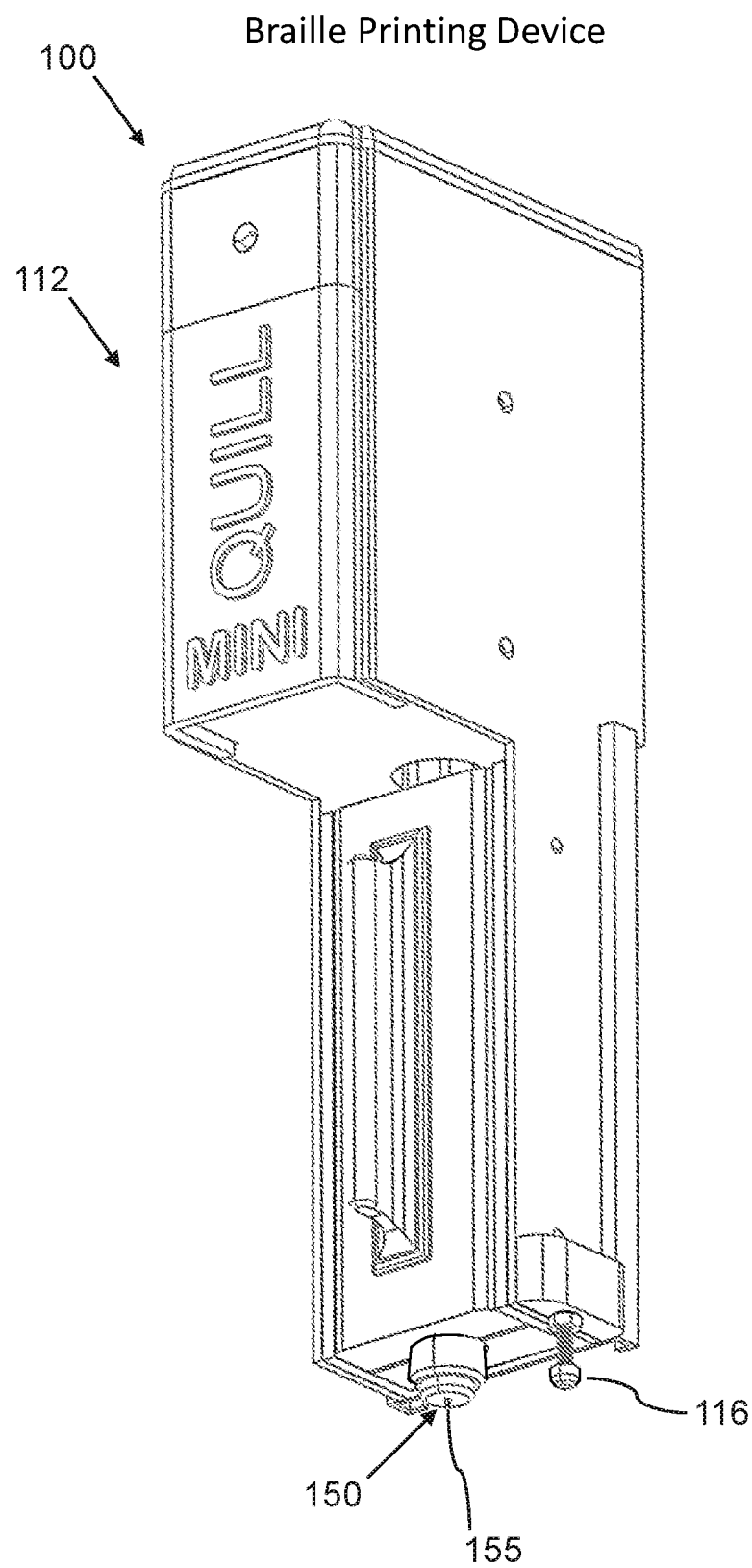
FIG. 1B is a bottom front perspective view of a braille printing device, according to an embodiment of the invention.

In the following, we describe the structure of an embodiment of a braille printing device 100 with reference to FIG. 1A, in such manner that like reference numerals refer to like components throughout; a convention that we shall employ for the remainder of this specification.

Figure 2:
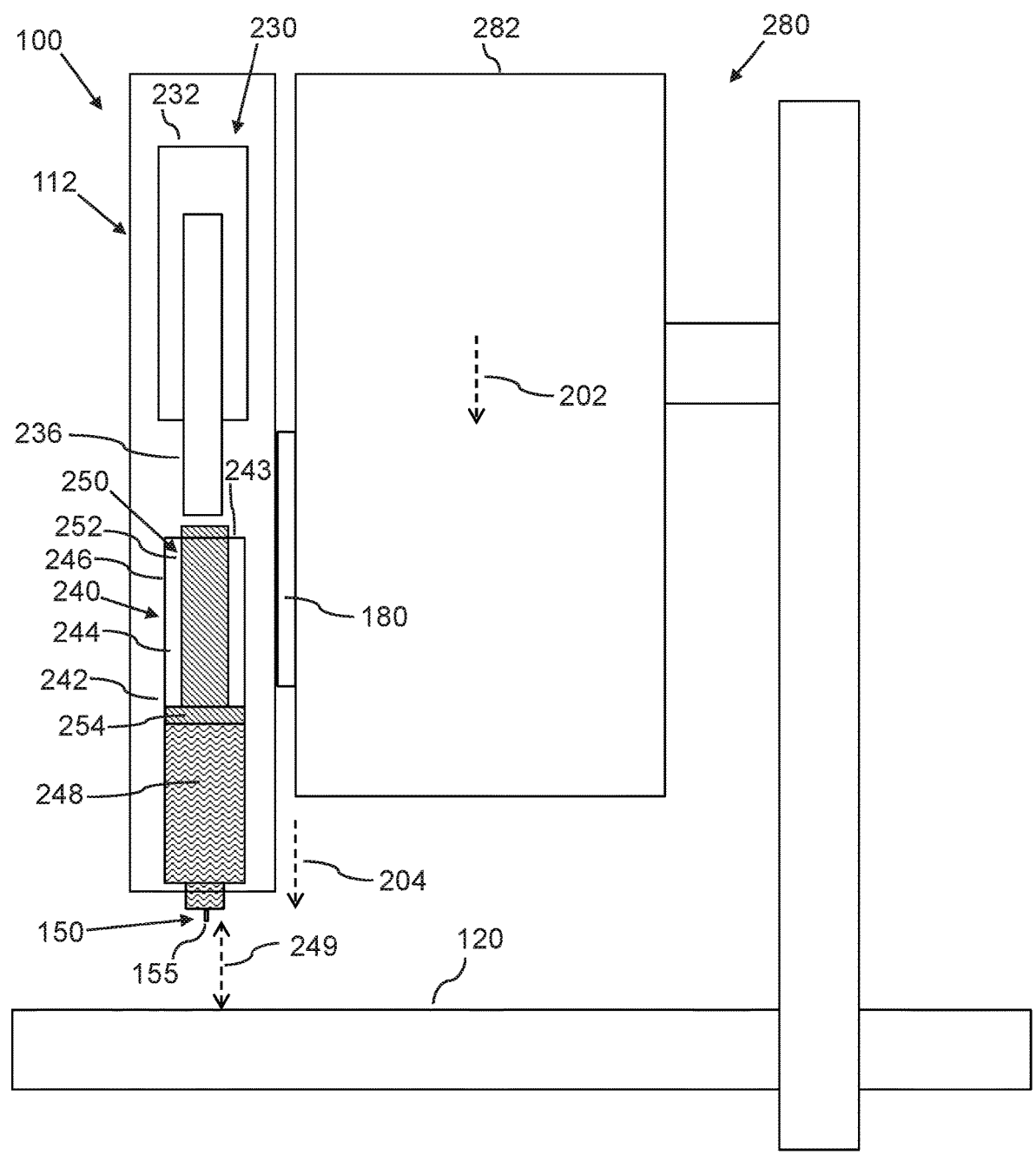
FIG. 2 is a schematic diagram of a braille printing device, according to an embodiment of the invention.

In various related embodiments, as shown in FIG. 2, the braille printing device 100 magnetically attaches to an existing engraving machine 280. When the engraving machine 280 moves up and down the braille printing device 100 uses a triggering rod switch to activate a high-speed digital timer that sends an electrical pulse to a striker motor, which causes an actuator hammer to strike a resin piston, which impacts with a liquid resin in an resin chamber. This striking operation causes a shockwave to travel thru the resin chamber resulting in a metered amount of UV curable resin to be discharged at the ejection aperture 155. The downward motion continues until the droplet comes in contact with a surface of a printing substrate. At this point, surface tension takes over and the droplet of resin is pulled from the printhead and is deposited on a surface of the printing substrate. After all of the resin braille dots have been discharged, a standard UV handheld light source can be used to fully cure the resin dots.

Figure 3A:
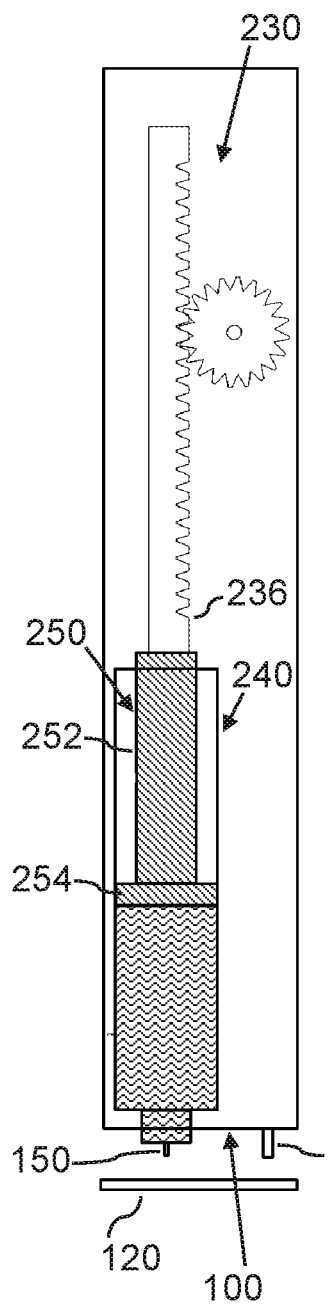
FIG. 3A is a schematic diagram of a braille printing device during a first step of operation, according to an embodiment of the invention.
Figure 3B:
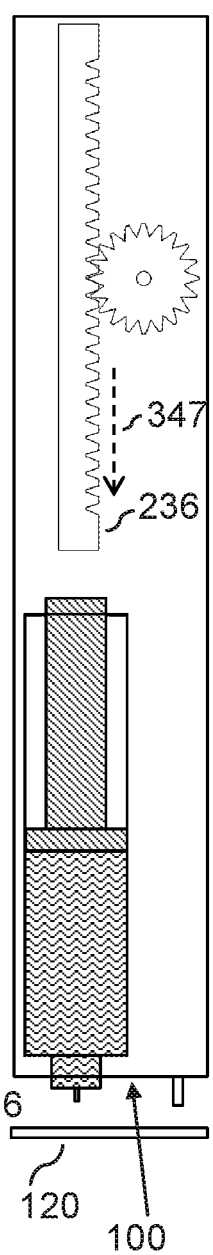
FIG. 3B is a schematic diagram of a braille printing device during a first step of operation, according to an embodiment of the invention.
Figure 3C:
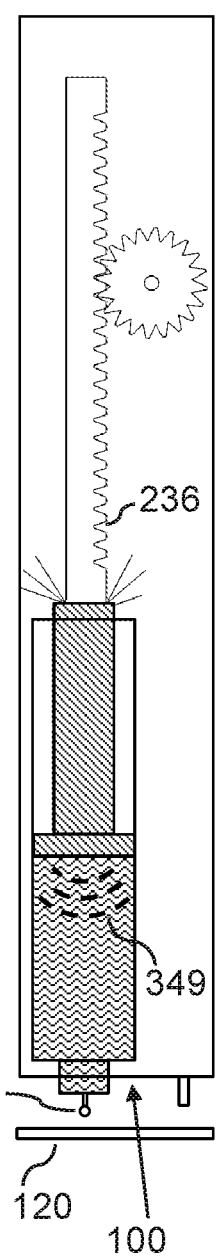
FIG. 3C is a schematic diagram of a braille printing device during a first step of operation, according to an embodiment of the invention.
Figure 3D:
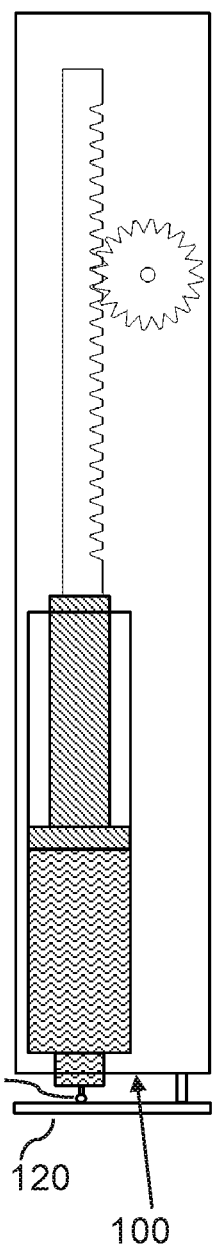
FIG. 3D is a schematic diagram of a braille printing device during a first step of operation, according to an embodiment of the invention.
Figure 4:
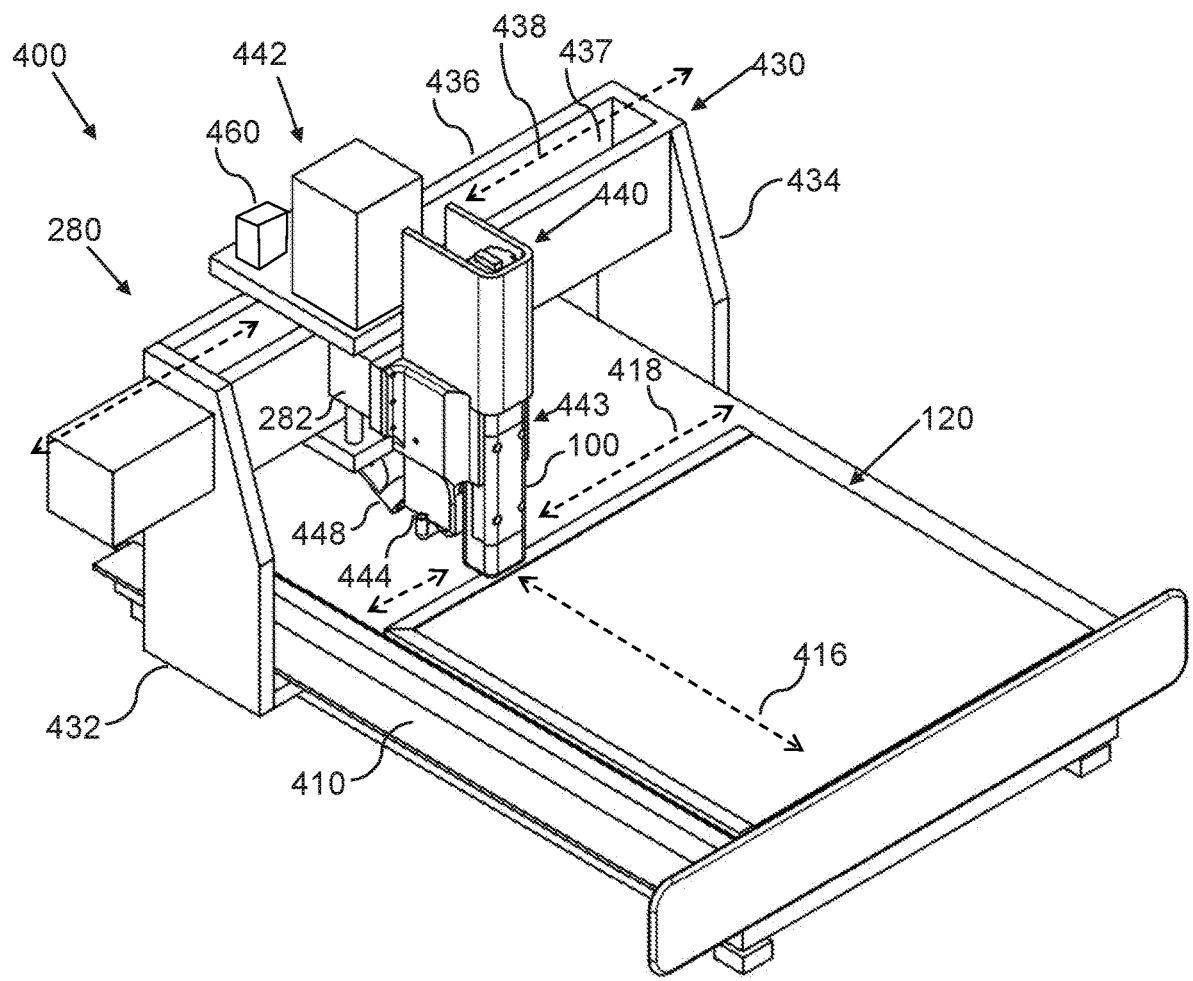
FIG. 4 is a front perspective view of a braille printing system, according to an embodiment of the invention.
Figure 5:
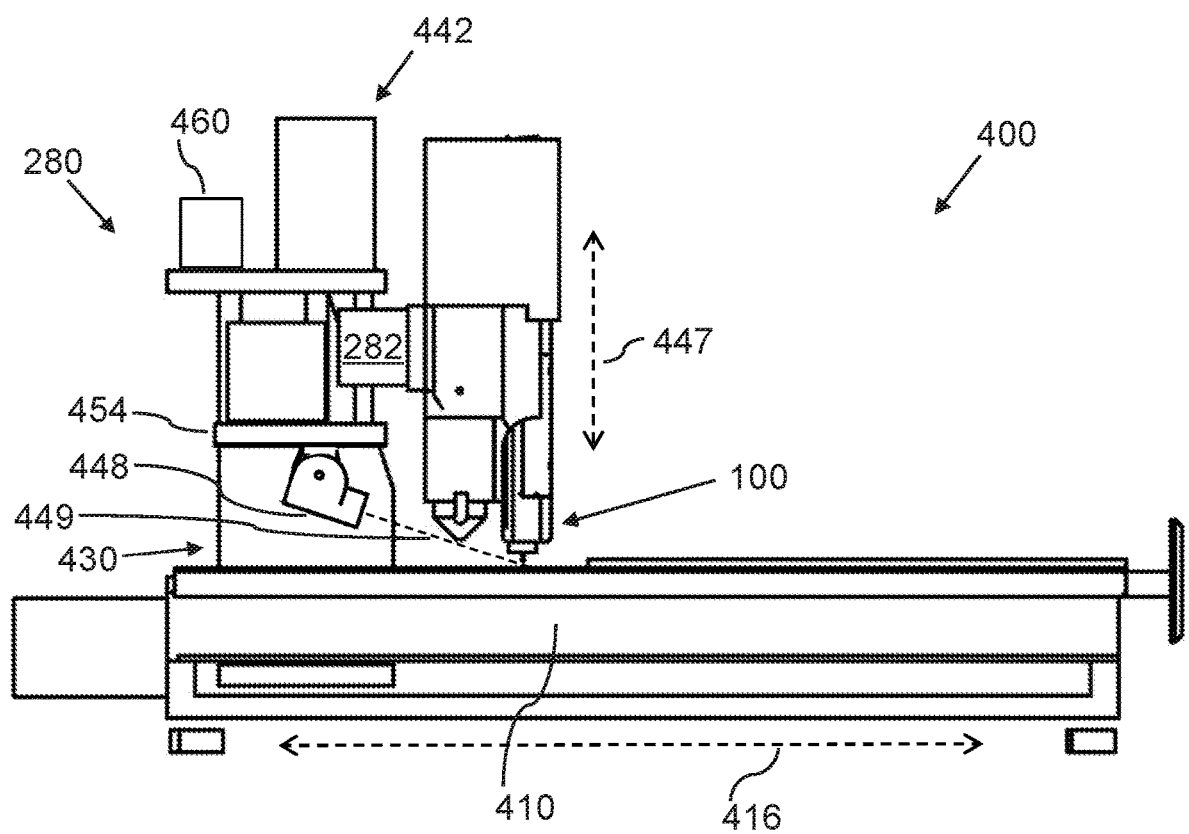
FIG. 5 is a side cross-sectional view of a braille printing system, according to an embodiment of the invention.

Thus, in an embodiment, as shown in FIGS. 1A, 1B, 1C, 1D, 2, 3D, 4, and 5, a braille printing device 100 can include:
a) a device body 112, which is configured to be detachably connected to a moveable portion 282 of an engraving machine 280, such that the device body 112 is configured to be vertically 447, longitudinally 416, and laterally 418 moveable by a corresponding movement of the moveable portion 282 of the engraving machine 280, as shown in FIGS. 4 and 5;
such that the device body 112 is configured to be vertically slidable 118 (i.e. up and down/vertically 118), to adjust a height 249 between an ejection aperture 155 of the braille printing device 100 and a printing panel 120;
b) a linear actuator 230, as shown in FIG. 2, which can include:
i. an actuator body 232, which can be connected to the device body; and
ii. an actuator hammer 236, which is configured to be vertically slidable, relative to the actuator body 232;
c) a liquid ejection unit 240, which is connected to the device body 112, such that an ejection aperture 155 of the liquid ejection unit 240 is configured to point downward, such that the liquid ejection unit 240 is configured to eject liquid drops 321 of a liquid resin 248 on a printing substrate 120, wherein the liquid ejection unit 240 can include:
i. a liquid container 242, which comprises an upper opening 243 into a container interior 244, which can contain (i.e. contains) a liquid resin 248;
ii. a resin piston 250, which comprises:
a shaft member 252; and
a piston member 254, which is connected to a lower end of the shaft member 252;

wherein the resin piston 250 penetrates into the container interior 244, such that the piston member 254 of the resin piston 250 seals walls 246 of the container interior 244, and such that downward pressure on the shaft member 252 of the resin piston 250 pressurizes the liquid resin 248 in the container interior; and iii. a dispensing tube 150, which is hollow, such that an upper end of the dispensing tube 150 is in fluid connection with the liquid container 242, wherein a lower end of the dispensing tube 150 includes an ejection aperture 155, which is in fluid contact with the liquid container 242;

d) a control unit 192, which can be configured to control the liquid ejection unit 240, such that the control unit 192 for example as shown can be mounted on the device body 112;

such that when the actuator hammer 236 strikes the upper part 252 of the resin piston 250, this causes the lower part 254 of the resin piston 250 to impact with the liquid resin 248, such that the lower part 254 of the resin piston 250 causes a shockwave 349 to travel through the liquid resin 248, such that the shockwave 349 pushes out a resin droplet 321 from the ejection aperture 155 (of the dispensing tube 150), such that the resin droplet 321 hangs from the ejection aperture 155 (and from the dispensing tube 150);

such that the resin droplet 321 contacts with a surface of a printing substrate 120 below the dispensing tube 150, when the braille printing device 100 is moved downward, as shown in FIG. 3D, until the ejection aperture 155 of the dispensing tube 150 is within a predetermined minimum distance from the printing substrate 120, whereby surface tension causes the resin droplet 321 to transfer to the surface of the printing substrate 120, such that the resin droplet 321 forms a braille dot 122 on the surface of the printing substrate 120;

such that the control unit 192 can be configured to control the liquid ejection unit 240, such that the liquid ejection unit 240 can deposit spherical domes/dots 122 of the liquid resin 248 on an exposed surface of the printing substrate 120, such that the spherical domes 122 form a braille text 123 of raised braille elements.

In a related embodiment, the braille printing device 100 can further include:

a battery pack 194, which powers electric components of the braille printing device 100, such as the control unit 192 and the linear actuator 230.

In a related embodiment, the braille printing device 100 can further include:

a slidable connector 180, which can be magnetic, such that the slidable connector 180 is configured as a slidable magnetic plate 180; such that the slidable connector 180 is slidably 182 connected to the device body 112 and configured to be detachably connected to a moveable portion 282 of an engraving machine 280, such that the slidable connector 180 can slide downward to prevent damage to the ejection aperture 155, if a lowest end 106 of the braille printing device 100 impacts with the printing substrate 120 during a downward movement 204 of the braille printing device 100, wherein the downward movement 204 is caused by a downward movement 202 of the moveable portion 282 of the engraving machine 280.

Thereby, the slidable magnetic plate 180 can be detachably attached to a magnetic moveable portion 282 of an engraving machine 280, such as for example a moveable portion 282 made of ferritic stainless steel, as shown in FIG. 2.

In another related embodiment, the braille printing device 100 can further include:

a vertical stop 116, which is connected to the device body 112 in a vertical orientation, such that a lower end 106 of the vertical stop 116 protrudes below the ejection aperture 155;

such that when the lower end of the vertical stop 116 impacts with the printing substrate 120, the ejection aperture 155 is in close proximity to the printing substrate 120, such that the ejection aperture 155 is adjacent to the printing substrate 120, but the dispensing tube 150 does not touch the printing substrate 120, such that when a resin droplet 122 is ejected from the ejection aperture 155 the resin droplet 122 will contact with the printing substrate 120 and transfer to the printing substrate 120;

such that the slidable connector 180 slides downward, when the lower end of the vertical stop 116 impacts with the printing substrate 120 during a downward movement of the braille printing device 100, wherein the downward movement is controlled by the moveable portion 282 of the engraving machine 280.

In a further related embodiment, the vertical stop 116 can be configured to be length adjustable, such that a protrusion length 119 of the vertical stop 116 is adjustable, for example such that the vertical stop 116 is configured as a tightenable screw.

Figure 7A:
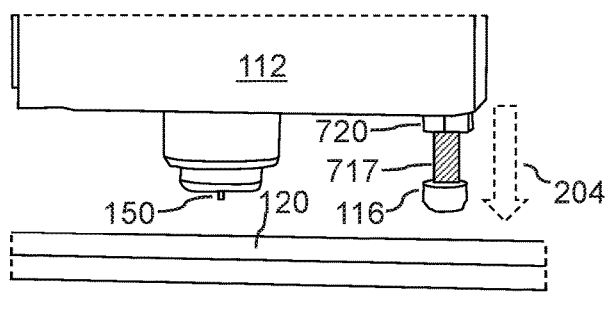
FIG. 7A is a front perspective view of a lower part of a braille printing device before impact with a printing substrate, according to an embodiment of the invention.

In another related embodiment, as shown in FIG. 7A, the vertical stop 116 can further include:

threading 717 on an upper part of the vertical stop 116, such that the vertical stop 116 can be configured to screw into the device body 112, to enable adjustment of the protrusion length 119, by screwing the vertical stop 116 in or out to respectively shorten or lengthen a protrusion length 119 of the vertical stop 116. The vertical stop can be secured in position with a bolt 720 that is screwed onto the threading 717; such that the bolt 720 is tightened against the device body 112 once a specific protrusion length 119 has been set.

In an embodiment, as shown in FIGS. 3A, 3B, 3C, and 3D, a manufacturing sequence of using the braille printing device 100 can include:

a) Slowly lowering the actuator hammer 236, as shown in FIG. 3A, until the actuator hammer 236 contacts with the shaft member 252 of the resin piston 250;

b) Raising the actuator hammer 236 (using micro motor pulses at millisecond intervals), as shown in FIG. 3B, to bring the actuator hammer 236 to a predetermined height from the shaft member 252 of the resin piston 250;

c) Rapidly moving the actuator hammer 236 downward (using micro motor pulses at millisecond intervals), as shown in FIG. 3C, to strike the shaft member 252 of the resin piston 250, such that the piston member 254 of the resin piston 250 causes a shockwave 349 to travel through the liquid resin 248, such that the shockwave 349 pushes out a resin droplet 321 from the dispensing tube 150, such that the resin droplet 321 hangs from the dispensing tube 150. An outer surface of the dispensing tube 150 can be coated with a low friction coating, such as a TEFLON™ coating, i.e. a coating that is made from or includes polytetrafluoroethylene, such that the low-friction coating prevents the resin droplet 321 from moving up along an outer surface of the dispensing tube 150 due to surface tension;

d) Moving the main body of the braille printing device 100 downward, as shown in FIG. 3D, until a lower end of the dispensing tube 150 is within a predetermined minimum distance from a printing substrate 120, such that the resin droplet 321 contacts with the printing substrate 120, such that surface tension causes the resin droplet 321 to transfer to the printing substrate 120, such that the resin droplet 321 forms a braille dot 122;

e) Moving the main body of the braille printing device 100 upward, such that the main body of the braille printing device 100 is returned to an initial position, as shown in FIG. 2A; and optionally f) Exposing the resin droplet to ultraviolet light, such that the resin droplet is cured and hardened, for example by using a handheld ultraviolet light source.

In another related embodiment, the braille printing device 100 can further include:

a) a trigger switch 162, which is connected to the device body 112 above the slidable connector 180;

such that the trigger switch 162 is released, i.e. a pressure on the trigger switch 162 stops, when the slidable connector 180 slides downward when the lowest end 106 of the braille printing device 100 impacts with the printing substrate, during the downward movement 204 of the braille printing device 100;

such that when the trigger switch 162 is released, the control unit 192 is configured to control the liquid ejection unit 240, to eject a resin droplet 321 from the ejection aperture 155.

Figure 7B:
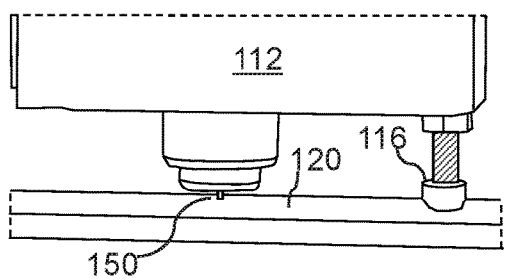
FIG. 7B is a front perspective view of a lower part of a braille printing device after impact with a printing substrate, according to an embodiment of the invention.

Thereby, in related embodiments, when the slidable magnetic plate 180 is detachably attached to a magnetic moveable portion 282 of an engraving machine, the device body 112 will slide downward under the influence of gravity until the trigger switch 162 impacts with the slidable magnetic plate 180 and thereby puts pressure on the trigger switch 162. When the moveable portion 282 is then moved downward, once the vertical stop 116 impacts with the printing substrate 120, as shown in FIG. 7B, the slidable magnetic plate 180 will begin to slide downward, such that the trigger switch 162 is released, as shown in FIG. 7D, which thereby causes ejection of a resin droplet 122, which is transferred to the printing substrate 120, as shown in FIGS. 7E and 7F.

Figure 1D:
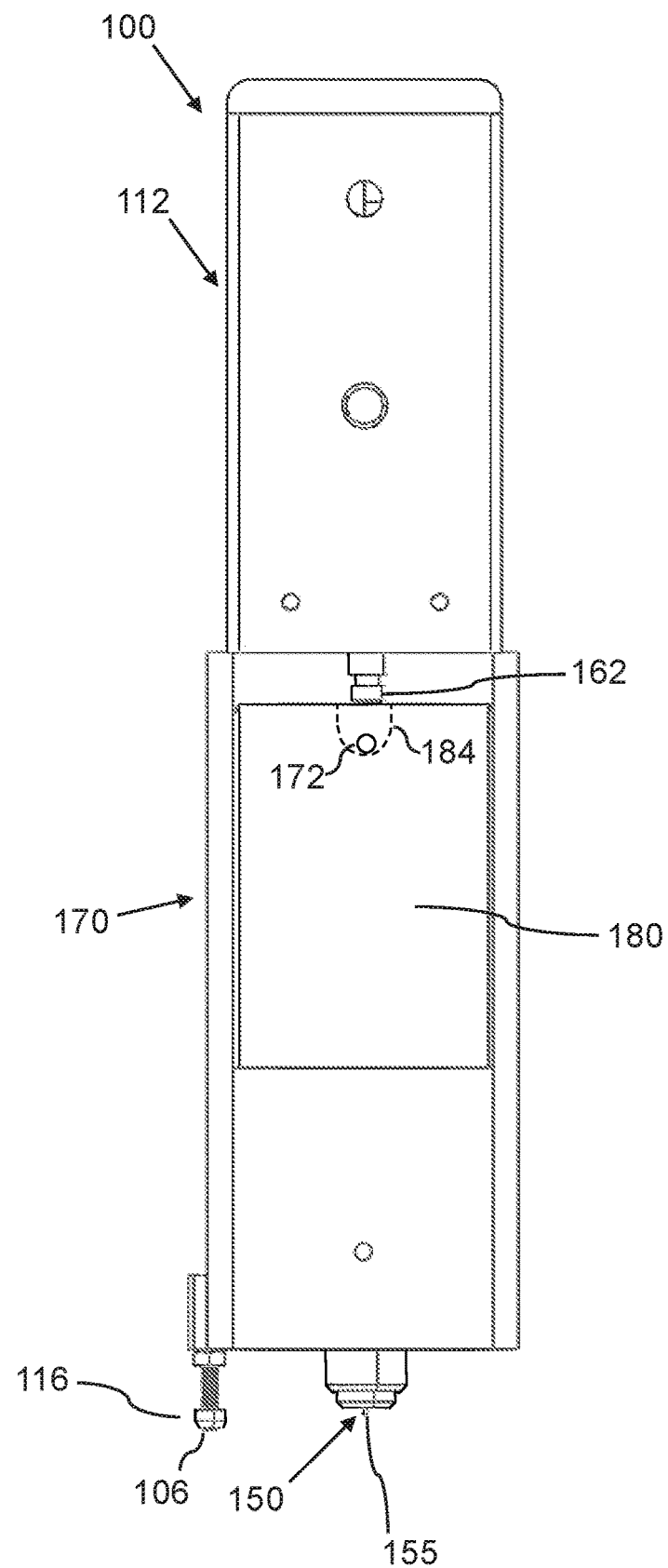
FIG. 1D is a rear side view of a braille printing device, according to an embodiment of the invention.
Figure 1E:
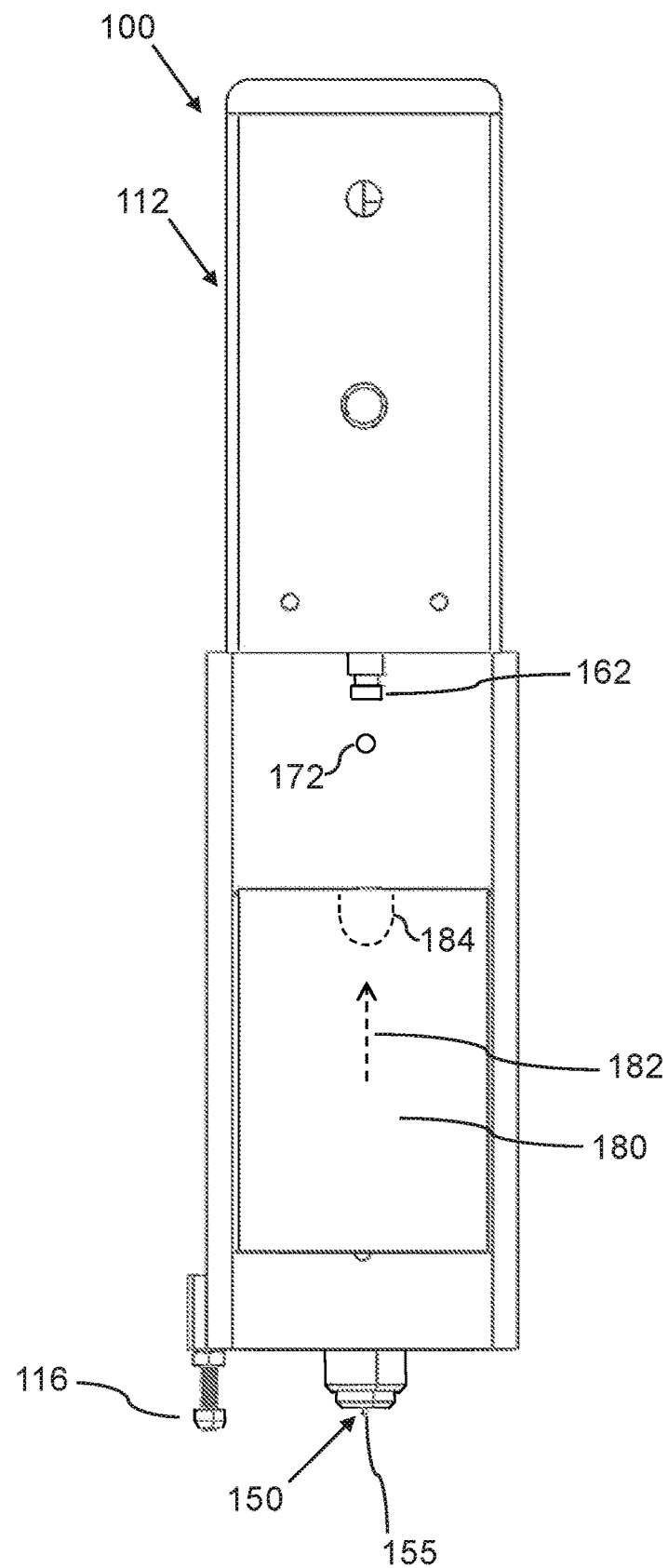
FIG. 1E is a rear side view of a braille printing device, according to an embodiment of the invention.
Figure 1F:
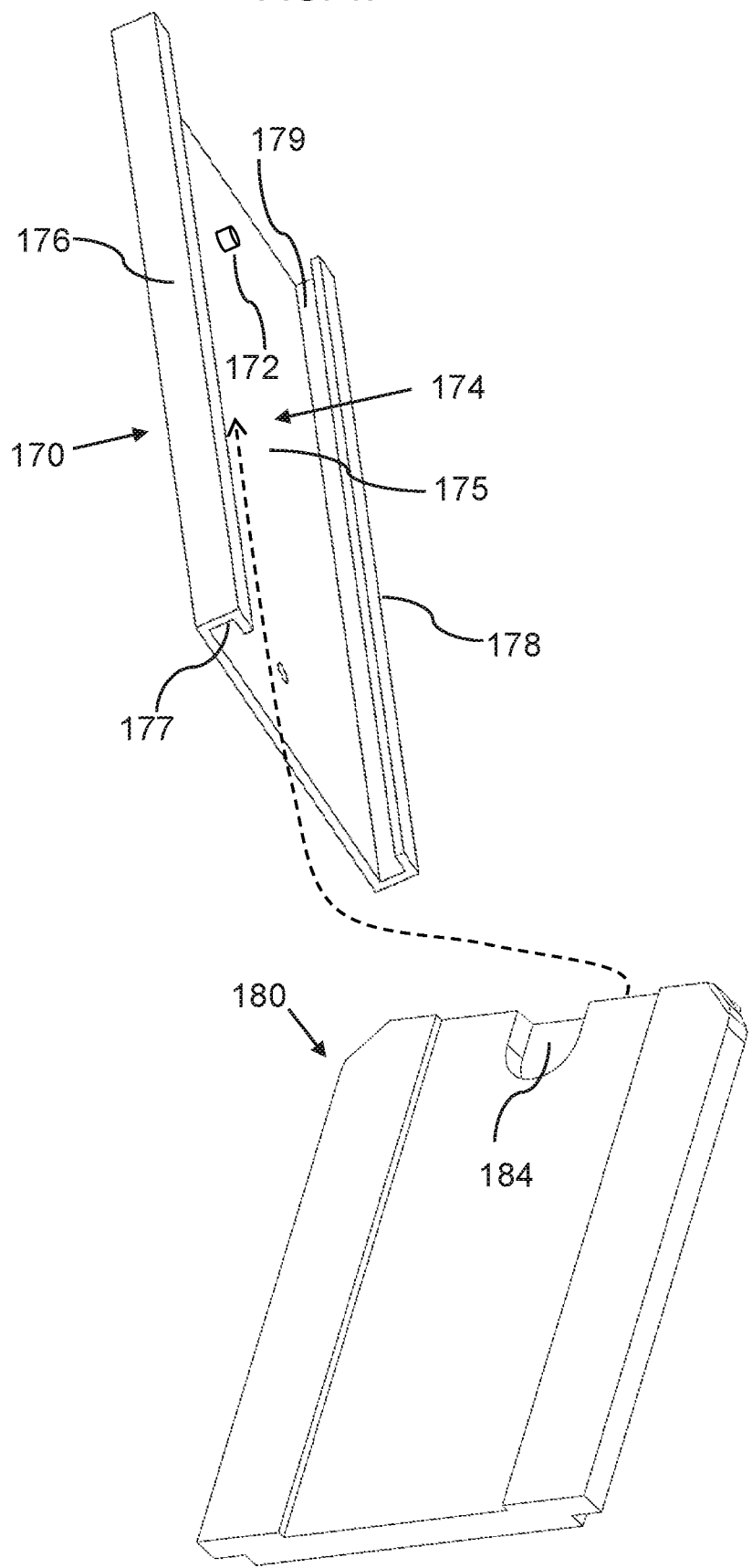
FIG. 1F is a perspective view of a slide holder plate and a slidable connector, in a disassembled state, prior to insertion of slidable connector into slide holder plate, according to an embodiment of the invention.
Figure 1G:
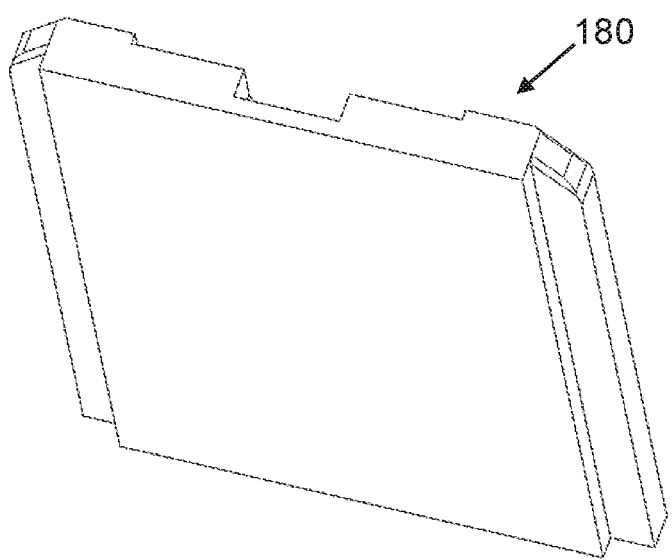
FIG. 1G is a top front perspective view of a slidable connector, according to an embodiment of the invention.
Figure 1H:
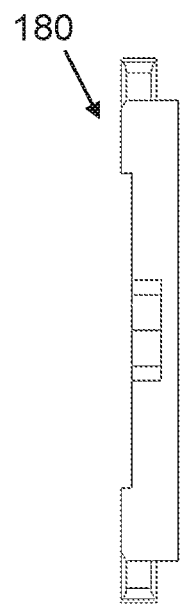
FIG. 1H is a top view of a slidable connector, according to an embodiment of the invention.

In another related embodiment, as shown in FIGS. 1D, 1E, and 1F, the braille printing device 100 can further include:

a) a slide stop member 172, which is connected to the device body 112 below the trigger switch 162, such that the slide stop member 172 protrudes outward from the device body 112;

such that the slide stop member 172 is configured to impact with the slidable connector 180 after the slidable connector 180 impacts with the trigger switch 162 during an upward motion 182 of the slidable connector 180 (relative to the device body 112), such that the slide stop member 172 stops the upward motion 182 of the slidable connector 180, to prevent an excessive pressure on the trigger switch 162, which could potentially over-compress and damage the trigger switch 162.

In a further related embodiment, the braille printing device 100 can further include:

a) a groove 184, which is positioned on an inner side of an upper end of the slidable connector 180, such that the groove 184 is configured to slide over the slide stop member 172, such that the slide stop member 172 impacts with a lower end of the groove 184.

In another further related embodiment, the braille printing device 100 can further include:

a) a slide holder plate 170, which is mounted on an outer side of the device body 112, wherein the slide holder plate 170 can further include:

i. a slide holder back portion 174, which can be a flat plate;

ii. the slide stop member 172, which is mounted on an outer side 175 of an upper end of the slide holder back portion 174;

iii. a first sliding rail 176 (or left sliding rail 176), which is mounted along a first vertical side of the slide holder back portion 174, such that the first sliding rail 176 can be I-shaped, to create an elongated ledge 177 along the first vertical side of the slide holder back portion 174; and iv. a second sliding rail 178 (or right sliding rail 178), which is mounted along a second vertical side of the slide holder back portion 174, such that the second sliding rail 178 can be I-shaped, to create an elongated ledge 178 along the second vertical side of the slide holder back portion 174;

such that the slidable connector 180 is slidably mounted and held in place between the first sliding rail 176 and the second sliding rail 178.

Figure 7C:
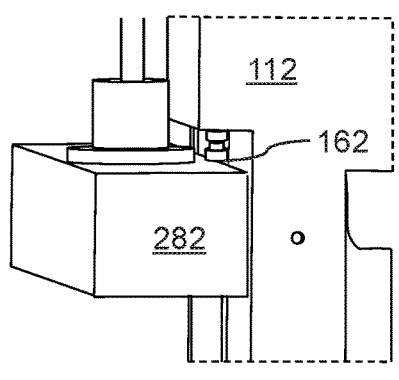
FIG. 7C is a rear perspective view of a part of a braille printing device showing a trigger switch before release, according to an embodiment of the invention.
Figure 7D:
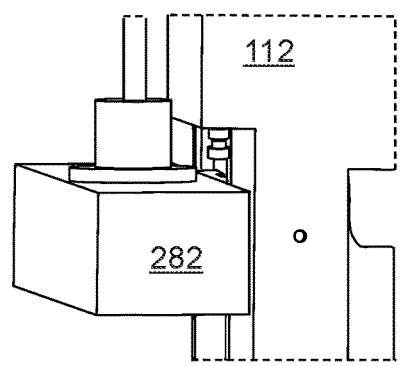
FIG. 7D is a rear perspective view of a part of a braille printing device showing a trigger after before release, according to an embodiment of the invention.
Figure 7E:
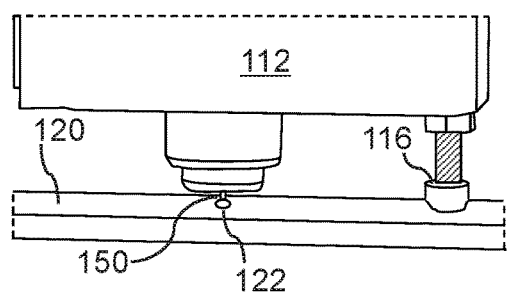
FIG. 7E is a front perspective view of a lower part of a braille printing device after impact with a printing substrate during ejection of resin droplet, according to an embodiment of the invention.
Figure 7F:
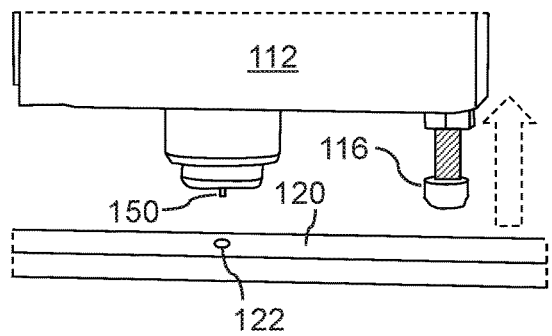
FIG. 7F is a front perspective view of a lower part of a braille printing device after of deposition of resin droplet during upward movement of braille printing device, according to an embodiment of the invention.

In a further related embodiment, as shown in FIGS. 7A, 7B, 7C, 7D, 7E, and 7F, a sequence for controlling movement of the braille printing device 100 can include:

a) The lower end of the dispensing tube 150 is moved downward by a moveable portion 282 of the engraving machine 280, as shown in FIG. 7A;

b) As shown in FIG. 7B: The vertical stop 116 then contacts with the printing substrate 120, As shown in FIG. 7B, which causes c) a continuing downward movement of the moveable portion 282 of the engraving machine 280:

i. from an initial position, as shown in FIGS. 7C and 1D, wherein the trigger switch 262 is pressed in, by a contact with the magnetic plate 180; such that the continuing movement causes ii. the magnetic plate 180 to slide downward, as shown in FIGS. 7D and 1E, such that the pressure is released on the trigger switch 262, which causes the control unit to activate the liquid ejection unit 240;

d) such that liquid ejection unit 240 ejects a resin droplet 321 from the ejection aperture 155, as shown in FIG. 7E, such that the resin droplet 122 contacts with the printing substrate 120, such that surface tension transfers the resin droplet 122 to the printing substrate 120;

e) such that the resin droplet 122 is deposited on the printing substrate 120 after upward movement of the moveable portion 282 of the engraving machine 280, as shown in FIG. 7E.

In a related embodiment, as shown in FIGS. 4 and 5, the braille printing device 100 can be a part of a braille printing system 400, which can also be referred to as a sign manufacturing system 400, which can include:

a) a printing base 410;

b) a printing panel 120, which can be removably positioned on a top surface of the printing base 410;

c) a bridge component 430, which can be slidably connected to the printing base 410, the bridge component 430 including:

i. a right flange 432, which is slidably connected to a right side of the printing base 410, such that the right flange 432 protrudes upward from the printing base 410;

ii. a left flange 434, which is slidably connected to a left side of the printing base 410, such that the left flange 434 protrudes upward from the printing base 410;

iii. a bridge connector 436, including a sliding cavity 437, such that the bridge connector 436 is connected between the right and left flanges 432 434;

such that the bridge component 430 (and thereby the bridge connector 436) can be configured to slide 416 along a longitudinal direction 416 relative to the printing base 410;

d) a sliding assembly 440, which can include:

i. an assembly body 442, which is slidably connected to the bridge connector 436, such that the sliding assembly 440 is configured to slide along a lateral direction 418 relative to the printing base 410 (corresponding to a longitudinal direction 438 of the bridge connector 436);

ii. A cutting/ejection assembly 443, which can also be referred to as a cutting and ejection assembly 443, including:

a cutting laser 444, which is connected to the assembly body 442, such that a cutting laser beam 449 emitted from the cutting laser 444 is configured to point downward and impact (i.e. hit) the printing panel 120 that is positioned on a top surface of the printing base 110; and a braille printing device 100, which is connected to the assembly body 442, such that an ejection aperture 155 of the braille printing device 100 is configured to point downward, such that the braille printing device 100 is configured to inject liquid drops 122 of a printing fluid 248 on the printing panel 120;

iii. a curing laser 448, as shown in FIGS. 4 and 5, which is slidably connected to the bridge connector 436, such that the curing laser 448 is configured to slide along the lateral direction 418 of the printing base 410; and e) a control unit 460, which is configured to control the sliding motions of the bridge component 430 in the longitudinal direction 416 and of the assembly body 442 in the lateral direction 418, such that the control unit 460 for example as shown can be mounted on the assembly body 442;

such that the control unit 460 can be configured to control the sliding motion of the sliding assembly 440, such that the braille printing device 100 can deposit spherical domes/dots 122 of the printing fluid on an exposed surface of the printing panel 120, such that the spherical domes 122 form a braille text 123 of raised braille elements;

such that a curing laser beam emitted from the curing laser 448 can be pointed at the spherical domes 122 in order to cure and harden the spherical domes 122.

In a related embodiment, as shown in FIGS. 2, 4 and 5, the cutting/ejection assembly 443 can be slidably connected to the assembly body 442 (and thereby to the bridge component 430), such that the sliding assembly 440 can be configured to enable the cutting/ejection assembly 443 to slide altitudinally 447 (i.e. up and down/vertically 447), to adjust a height 249 between an ejection aperture 155 of the braille printing device 100 and the printing panel 120 (such as for example an exposed surface of the transparent bottom layer 426). The height 249 is shown exaggerated from a typical height 249 in FIG. 2, for illustrative purposes. FIGS. 4 and 5 show typical heights 249 during use. In some related embodiments, the sliding assembly 440 can be configured to enable solely the braille printing device 100 to slide vertically 447 (i.e. up and down/altitudinal 447), to adjust a height 249 between an ejection aperture 155 of the braille printing device 100 and the printing panel 120.

Thus, in related embodiments, as shown in FIGS. 4 and 5, the braille printing system 400 can be understood to include an engraving machine 280, which includes a moveable portion 282 as a part of the assembly body 442 of the sliding assembly 440, wherein the braille printing device 100 is connected to the moveable portion 282, as shown in FIG. 2.

In a related embodiment, the printing fluid/resin 248 can be an optically sensitive resin, which can be configured to cure when exposed to ultraviolet light, such as optically sensitive resins used as dental adhesives or adhesives for industrial use, including resin/adhesive compositions of N,N-Dimethylacrylamide, Isobornyl Acrylate, at least one photo-initiator, a silane coupling agent, and combinations thereof.

In another related embodiment, the curing laser 448 can be configured such that the curing laser beam 449 has a wavelength of approximately 405 nm or is in a range of 403-407 nm, 400-410 nm, or a wider range.

In another related embodiment, the curing laser 448 can be configured such that the curing laser beam 449 can have a power output of approximately/substantially 20 mW, or be in a range of 5-40 mW, 10-40 mw, 5-100 mW, 20-500 mW, or a wider range.

Figure 6:
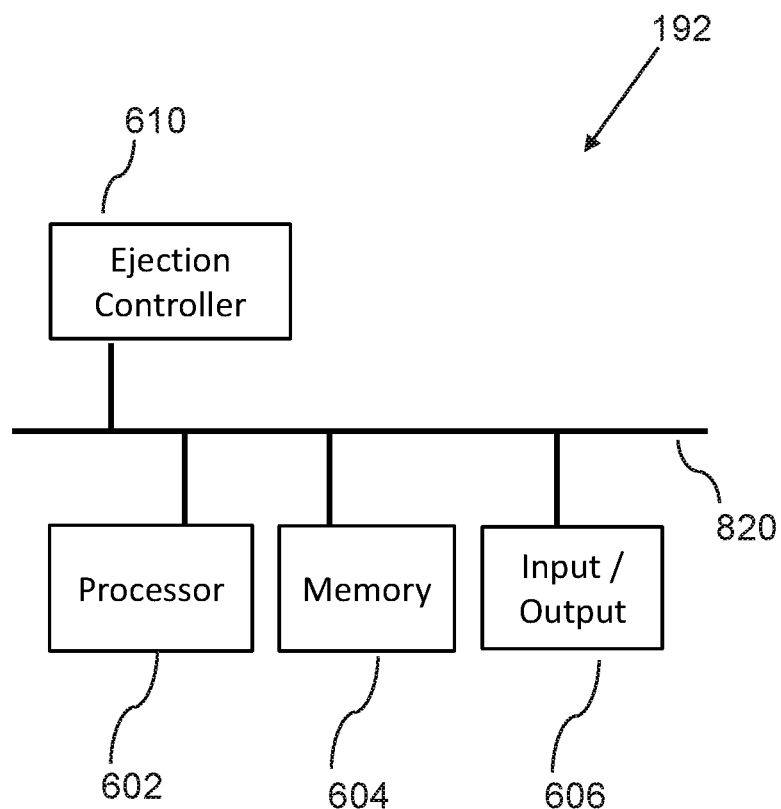
FIG. 6 is a schematic diagram illustrating a control unit for a braille printing device, according to an embodiment of the invention.

In a related embodiment, as shown in FIG. 6, the control unit 192 can include:

a) A processor 602;
b) A non-transitory memory 604;
c) An input/output 606; and
d) An ejection controller 610, which is configured to:
  i. control the linear actuator 230 to control an altitudinal/vertical sliding movement 347 of the actuator hammer 236, as shown FIG. 3B, such that the ejection controller 610 controls ejection of resin droplets 122 from the liquid ejection unit 240; all connected via
e) A data bus 820.

In further related embodiments, the disclosure of the braille printing system 400 and the engraving machine 280 shall be understood to include the use of various well-known mechanisms for longitudinal, lateral, and altitudinal movement of the braille printing device 100. Thus, the assembly body 442 or the engraving machine 280 shall be understood to include various related designs in use for additive and robotic manufacturing, including robotic arms, controllable "gooseneck" arms, and other designs permitting lateral and longitudinal positional adjustment and height adjustment over a printing surface.

In related embodiments, advantages of the braille printing device 100, include:

a) bypasses the need to drill hole in the signs surface;
b) uses far less steps to generate braille dots, as compared to conventional methods and systems;
c) faster and simpler to operate, as compared to conventional methods and systems; and
d) produces more durable Braille dots.

FIGS. 1A, 1B, 4, 5, and 6 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 1A, 1B, 4, 5, and 6 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

It shall be understood that the above-mentioned components of the control unit 192 are to be interpreted in the most general manner.

For example, the processor 602 can include a single physical microprocessor or microcontroller, a cluster of processors, a datacenter or a cluster of datacenters, a computing cloud service, and the like.

In a further example, the non-transitory memory 604 can include various forms of non-transitory storage media, including random access memory and other forms of dynamic storage, and hard disks, hard disk clusters, cloud storage services, and other forms of long-term storage. Similarly, the input/output 606 can include a plurality of well-known input/output devices, such as screens, keyboards, pointing devices, motion trackers, communication ports, and so forth.

Furthermore, it shall be understood that the control unit 192 can include a number of other components that are well known in the art of general computer devices, and therefore shall not be further described herein. This can include system access to common functions and hardware, such as for example via operating system layers such as WINDOWS™, LINUX™, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the control unit 192 can communicate with external devices, such as an app executing on a smartphone, over a network, which can include the general Internet, a Wide Area Network or a Local Area Network, or another form of communication network, transmitted on wired or wireless connections. Wireless networks can for example include Ethernet, Wi-Fi, BLUETOOTH™, ZIGBEE™, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the braille printing device 100, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A braille printing device, comprising:
   a) a device body, which is configured to be detachably connected to a moveable portion of an engraving machine, such that the device body is configured to be vertically, longitudinally, and laterally moveable by a corresponding movement of the moveable portion of the engraving machine;
   b) a linear actuator, which comprises:
      an actuator body, which is connected to the device body; and
      an actuator hammer, which is configured to be vertically slidable, relative to the actuator body; and
   c) a liquid ejection unit, comprising:
      a liquid container, which comprises a container interior with an upper opening, such that the container interior is configured to contain a liquid resin;
      a resin piston, which penetrates into the container interior via the upper opening, such that a lower part of the resin piston seals walls of the container interior, and such that downward pressure on an upper part of the resin piston pressurizes the liquid resin in the container interior; and
      an ejection aperture, which is in fluid contact with the liquid container;
   such that when the actuator hammer strikes the upper part of the resin piston, this causes the lower part of the resin piston to impact with the liquid resin, such that the lower part of the resin piston causes a shockwave to travel through the liquid resin, such that the shockwave pushes out a resin droplet from the ejection aperture, such that the resin droplet hangs from the ejection aperture;
   such that the resin droplet contacts with a surface of a printing substrate below the ejection aperture, whereby surface tension causes the resin droplet to transfer to the surface of the printing substrate, such that the resin droplet forms a braille dot on the surface of the printing substrate.

2. The braille printing device of claim 1, further comprising:
   a dispensing tube, which is hollow, such that an upper end of the dispensing tube is in fluid connection with the liquid container, wherein a lower end of the dispensing tube comprises the ejection aperture.

3. The braille printing device of claim 2, wherein an outer surface of the dispensing tube is coated with a low friction coating.

4. The braille printing device of claim 3, wherein the low friction coating comprises polytetrafluoroethylene.

5. The braille printing device of claim 1, wherein the resin piston further comprises:
   a) a shaft member; and
   b) a piston member;
   wherein the piston member is connected to a lower end of the shaft member.

6. The braille printing device of claim 1, further comprising:
   a control unit, which is configured to control the liquid ejection unit.

7. The braille printing device of claim 6, wherein the control unit further comprises:
   a) a processor;
   b) a non-transitory memory;
   c) an input/output; and
   d) an ejection controller, which is configured to control the linear actuator to control a vertical sliding movement of the actuator hammer, such that the ejection controller controls ejection of the resin droplet from the liquid ejection unit; all connected via
   e) a data bus.

8. The braille printing device of claim 1, further comprising:
   a slidable connector, which is slidably connected to the device body, such that the slidable connector is configured to be detachably connected to the moveable portion of the engraving machine, such that the slidable connector is configured to slide downward to prevent damage to the liquid ejection unit, if a lowest end of the braille printing device impacts with the printing substrate during a downward movement of the braille printing device.

9. The braille printing device of claim 8, wherein the slidable connector is magnetic, such that the slidable connector is configured as a slidable magnetic plate.

10. The braille printing device of claim 1, wherein the liquid container further comprises:
    the liquid resin;
    wherein the liquid resin is an optically sensitive resin, which is configured to cure when exposed to ultraviolet light.

11. The braille printing device of claim 8, further comprising:
    a vertical stop, which is connected to the device body, such that a lower end of the vertical stop protrudes below the ejection aperture;
    such that the slidable connector slides downward, when the lower end of the vertical stop impacts with the printing substrate during the downward movement of the braille printing device.

12. The braille printing device of claim 11, wherein the vertical stop is configured to be length adjustable, such that a protrusion length of the vertical stop is adjustable.

13. The braille printing device of claim 12, wherein the vertical stop further comprises:
    threading on an upper part of the vertical stop;
    such that the vertical stop is configured to screw into the device body to enable adjustment of the protrusion length.

14. The braille printing device of claim 8, further comprising:
    a control unit, which is configured to control the liquid ejection unit; and
    a trigger switch, which is connected to the device body above the slidable connector;
    such that the trigger switch is released, when the slidable connector slides downward when the lowest end of the braille printing device impacts with the printing substrate;
    such that when the trigger switch is released, the control unit is configured to control the liquid ejection unit, to eject the resin droplet from the ejection aperture.

15. The braille printing device of claim 14, further comprising:
    a slide stop member, which is connected to the device body below the trigger switch, such that the slide stop member protrudes outward from the device body;
    such that the slide stop member is configured to impact with the slidable connector after the slidable connector impacts with the trigger switch during an upward motion of the slidable connector, such that the slide stop member stops the upward motion of the slidable connector, to prevent an excessive pressure on the trigger switch.

16. The braille printing device of claim 15, further comprising:
- a groove, which is positioned on an inner side of an upper end of the slidable connector, such that the groove is configured to slide over the slide stop member, such that the slide stop member impacts with a lower end of the groove.

17. The braille printing device of claim 15, further comprising:
- a slide holder plate, which is mounted on an outer side of the device body, wherein the slide holder plate comprises:
  - a slide holder back portion;
  - the slide stop member, which is mounted on an outer side of an upper end of the slide holder back portion;
  - a first sliding rail, which is mounted along a first vertical side of the slide holder back portion; and
  - a second sliding rail, which is mounted along a second vertical side of the slide holder back portion;
  - such that the slidable connector is slidably mounted and held in place between the first sliding rail and the second sliding rail.

18. A braille printing device, comprising:
a) a linear actuator, which comprises:
- an actuator hammer, which is configured to be vertically slidable; and
b) a liquid ejection unit, comprising:
- a liquid container, which comprises a container interior with an upper opening, such that the container interior is configured to contain a liquid resin;
- a resin piston, which penetrates into the container interior via the upper opening, such that a lower part of the resin piston seals walls of the container interior, and such that downward pressure on an upper part of the resin piston pressurizes the liquid resin in the container interior; and
- an ejection aperture, which is in fluid contact with the liquid container;
wherein the braille printing device is configured to be detachably connected to a moveable portion of an engraving machine, such that the braille printing device is configured to be vertically, longitudinally, and laterally moveable by a corresponding movement of the moveable portion of the engraving machine;
such that when the actuator hammer strikes the upper part of the resin piston, this causes the lower part of the resin piston to impact with the liquid resin, such that the lower part of the resin piston causes a shockwave to travel through the liquid resin, such that the shockwave pushes out a resin droplet from the ejection aperture, such that the resin droplet hangs from the ejection aperture;
such that the resin droplet contacts with a surface of a printing substrate surface below the ejection aperture, whereby surface tension causes the resin droplet to transfer to the surface of the printing substrate, such that the resin droplet forms a braille dot on the surface of the printing substrate.

19. The braille printing device of claim 18, further comprising:
- a device body, which is configured to be connected to the moveable portion of the engraving machine, such that the device body is configured to be vertically, longitudinally, and laterally moveable by the corresponding movement of the moveable portion of the engraving machine;
- wherein the linear actuator is connected to the device body.

20. The braille printing device of claim 18, further comprising:
- a dispensing tube, which is hollow, such that an upper end of the dispensing tube is in fluid connection with the liquid container, wherein a lower end of the dispensing tube comprises the ejection aperture.

21. The braille printing device of claim 19, further comprising:
- a slidable connector, which is slidably connected to the device body, such that the slidable connector is configured to be detachably connected to the moveable portion of the engraving machine, such that the slidable connector is configured to slide downward to prevent damage to the liquid ejection unit, if a lowest end of the braille printing device impacts with the printing substrate during a downward movement of the braille printing device.

22. The braille printing device of claim 21, wherein the slidable connector is magnetic, such that the slidable connector is configured as a slidable magnetic plate.

23. The braille printing device of claim 21, further comprising:
- a vertical stop, which is connected to the device body, such that a lower end of the vertical stop protrudes below the ejection aperture;
- such that the slidable connector slides downward, when the lower end of the vertical stop impacts with the printing substrate during the downward movement of the braille printing device.

24. The braille printing device of claim 21, further comprising:
- a control unit, which is configured to control the liquid ejection unit; and
- a trigger switch, which is connected to the device body above the slidable connector;
- such that the trigger switch is released, when the slidable connector slides downward when the lowest end of the braille printing device impacts with the printing substrate;
- such that when the trigger switch is released, the control unit is configured to control the liquid ejection unit, to eject the resin droplet from the ejection aperture.

25. The braille printing device of claim 24, further comprising:
- a slide stop member, which is connected to the device body below the trigger switch, such that the slide stop member protrudes outward from the device body;
- such that the slide stop member is configured to impact with the slidable connector after the slidable connector impacts with the trigger switch during an upward motion of the slidable connector, such that the slide stop member stops the upward motion of the slidable connector, to prevent an excessive pressure on the trigger switch.

* * * * *